United States Patent
Hong

(10) Patent No.: US 11,540,294 B2
(45) Date of Patent: Dec. 27, 2022

(54) METHOD AND APPARATUS FOR ELIMINATING INTERMODULATION INTERFERENCE, USER EQUIPMENT AND BASE STATION

(71) Applicant: BEIJING XIAOMI MOBILE SOFTWARE CO., LTD., Beijing (CN)

(72) Inventor: Wei Hong, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 82 days.

(21) Appl. No.: 16/651,956

(22) PCT Filed: Sep. 28, 2017

(86) PCT No.: PCT/CN2017/104012
§ 371 (c)(1),
(2) Date: Mar. 27, 2020

(87) PCT Pub. No.: WO2019/061157
PCT Pub. Date: Apr. 4, 2019

(65) Prior Publication Data
US 2020/0260461 A1 Aug. 13, 2020

(51) Int. Cl.
*H04W 72/04* (2009.01)
*H04W 72/08* (2009.01)

(52) U.S. Cl.
CPC ..... *H04W 72/082* (2013.01); *H04W 72/0453* (2013.01)

(58) Field of Classification Search
None
See application file for complete search history.

(56) References Cited

U.S. PATENT DOCUMENTS

| 2014/0233524 | A1* | 8/2014 | Jang | H04W 74/0833 |
| | | | | 370/329 |
| 2015/0023268 | A1* | 1/2015 | Uchino | H04L 5/0092 |
| | | | | 370/329 |
| 2016/0218853 | A1* | 7/2016 | Takeda | H04W 72/042 |
| 2017/0279567 | A1* | 9/2017 | Rahman | H04L 5/1469 |
| 2019/0081657 | A1* | 3/2019 | Zeng | H04B 1/711 |
| 2019/0082352 | A1* | 3/2019 | Hua | H04W 72/048 |

(Continued)

FOREIGN PATENT DOCUMENTS

| CN | 103916350 A | 7/2014 |
| CN | 105432132 A | 3/2016 |

(Continued)

OTHER PUBLICATIONS

First Office Action of Chinese Application No. 2017800016209.6 dated Mar. 10, 2021 with English translation, (12p).

(Continued)

*Primary Examiner* — The Hy Nguyen
(74) *Attorney, Agent, or Firm* — Arch & Lake LLP

(57) ABSTRACT

The method for eliminating intermodulation interference includes: determining, by a base station, a second signaling based on a first signaling, wherein the first signaling is a user equipment capability enquiry signaling, and the second signaling carries instruction information instructing a user equipment to send transmission capacity on a combination of different frequency bands; and sending the second signaling.

10 Claims, 9 Drawing Sheets

(56) References Cited

U.S. PATENT DOCUMENTS

| | | | | |
|---|---|---|---|---|
| 2019/0110190 A1* | 4/2019 | Van Lieshout | ....... | H04L 67/303 |
| 2020/0029347 A1* | 1/2020 | Huang | .............. | H04W 72/1263 |
| 2020/0288457 A1* | 9/2020 | Hong | .................... | H04L 1/1812 |
| 2021/0143963 A1* | 5/2021 | Matsuda | ............... | H04L 5/0094 |

FOREIGN PATENT DOCUMENTS

| | | |
|---|---|---|
| CN | 105517043 A | 4/2016 |
| CN | 106507495 A | 3/2017 |
| CN | 106792869 A | 5/2017 |
| WO | 2015142248 A1 | 9/2015 |

OTHER PUBLICATIONS

International Search Report (including English translation) and Written Opinion issued in PCT/CN2017/104012, dated Jun. 27, 2018, 8 pages.

\* cited by examiner

METHOD AND APPARATUS FOR ELIMINATING INTERMODULATION INTERFERENCE, USER EQUIPMENT AND BASE STATION

CROSS-REFERENCE TO RELATED APPLICATION

This application is a national phase application based on PCT/CN2017/104012, filed on Sep. 28, 2017, the content of which is incorporated herein by reference for all purposes.

TECHNICAL FIELD

The present disclosure relates to the technical field of communication, and in particular, to a method and an apparatus for eliminating intermodulation interference, a user equipment and a base station.

BACKGROUND

In order to make 5th Generation (5G) faster commercial use, the 3rd Generation Partnership Project (3GPP) has approved preferential standardization of the Non-Stand Alone (NSA) scenario. The NSA scenario refers to the dual connection scenario using an LTE base station as a primary base station and a 5G base station as a secondary base station. In the NSA scenario, a user equipment (UE) needs to maintain two communication links simultaneously, which respectively are a Long-Term Evolution (LTE) communication link and a New Radio (NR) communication link.

SUMMARY

The present disclosure provide a method and an apparatus for eliminating intermodulation interference, a user equipment and a base station.

According to a first aspect of examples of the present disclosure, a method for eliminating intermodulation interference is provided. The methods includes:

determining, by a base station, a second signaling based on a first signaling, wherein the first signaling is a user equipment capability enquiry signaling, and the second signaling carries instruction information instructing a user equipment to send transmission capacity on a combination of different frequency bands; and sending the second signaling.

According to a second aspect of examples of the present disclosure, a method for eliminating intermodulation interference is provided. The method is applied to a user equipment. The method includes:

receiving a second signaling sent by a base station, wherein the second signaling carries instruction information instructing the user equipment to send transmission capacity on a combination of different frequency bands;

determining a response signaling based on the second signaling, wherein the response signaling carries the transmission capacity of the user equipment on the combination of different frequency bands; and sending the response signaling to the base station.

According to a third aspect of examples of the present disclosure, a base station is provided. The base station includes:

a processor; and a memory for storing instructions executable by the processor, wherein the processor is configured to:

determine a second signaling based on a first signaling, wherein the first signaling is a user equipment capability enquiry signaling, and the second signaling carries instruction information instructing a user equipment to send transmission capacity on a combination of different frequency bands; and send the second signaling.

It is to be understood that both the foregoing general description and the following detailed description are exemplary and explanatory only and are not intended to limit the present disclosure.

BRIEF DESCRIPTION OF THE DRAWINGS

The accompanying drawings, which are incorporated in and constitute a part of this specification, illustrate examples consistent with the present disclosure and, together with the description, serve to explain the principles of the present disclosure.

DETAILED DESCRIPTION

Figure 1A:
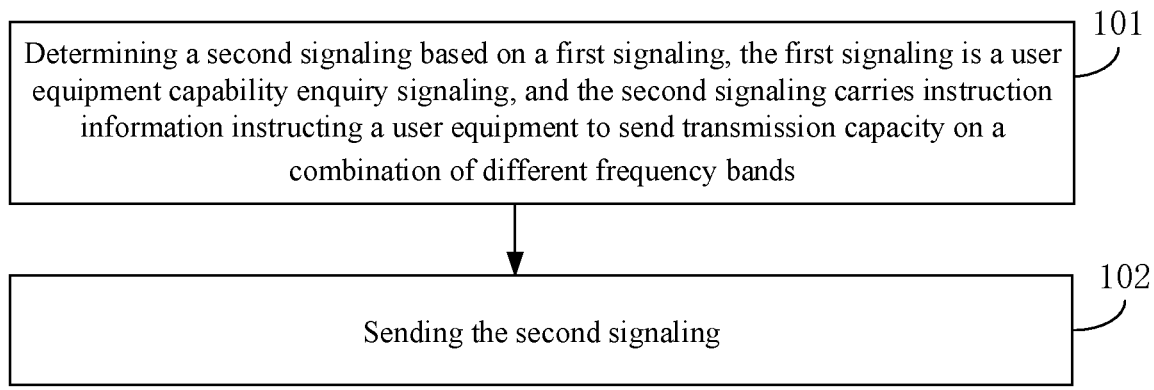
FIG. 1A is a flowchart of a method for eliminating intermodulation interference according to an example.

Description will be made in detail to examples, examples of which are illustrated in the accompanying drawings. The following description hereinafter refers to the accompanying drawings, the same reference numerals in different drawings represent the same or similar elements, unless otherwise represented. The implementations set forth in the following description of examples do not represent all implementations consistent with the present disclosure. Instead, these implementations are merely examples of devices and methods.

Figure 1B:
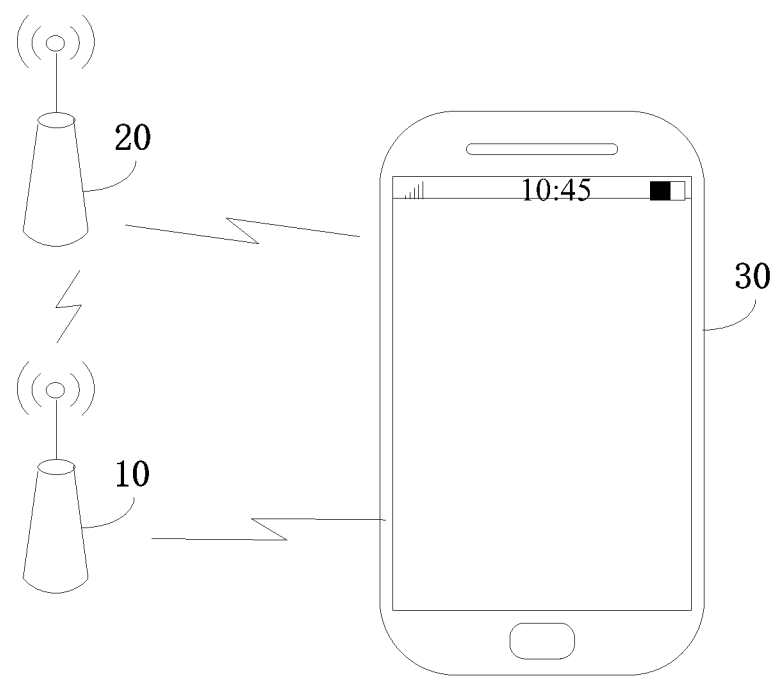
FIG. 1B is an application scenario diagram of a method for eliminating intermodulation interference according to an example.

FIG. 1A is a flowchart of a method for eliminating intermodulation interference according to an example, and FIG. 1B is an application scenario diagram of a method for eliminating intermodulation interference according to an example. The method for eliminating intermodulation interference can be applied to a base station. As shown in FIG. 1A, the method for eliminating intermodulation interference includes the following steps 101-102.

In step 101, a second signaling is determined based on a first signaling. The first signaling is a user equipment capability enquiry signaling, and the second signaling carries instruction information instructing a user equipment to send transmission capacity on a combination of different frequency bands.

In an example, the transmission capacity on the combination of different frequency bands includes: the ability to support simultaneous data sending on the combination of different frequency bands; or the ability to support simultaneous data sending and receiving on the combination of different frequency bands. In an example, in case that the user equipment only sends the ability to support simultaneous data sending on the combination of different frequency bands, such as sending the transmission capacity of supporting simultaneous sending on 2 UL, it can be understood that the user equipment also supports the ability of simultaneous data receiving on this combination. For example, in case that the user equipment only sends the transmission capacity of supporting simultaneous sending on the 1000 MHz frequency band and the 1100 MHz frequency band, it can be understood that when the user equipment send data simultaneously on the 1000 MHz frequency band and the 1100 MHz frequency band, the user equipment also supports data receiving on the 1000 MHz frequency band and the 1100 MHz frequency band. In an example, in case that the user equipment sends the ability of simultaneous data sending and receiving on a combination of different frequency bands, such as sending the transmission capacity of the ability to support 2 UL+1 DL, it can be understood that the user equipment supports the transmission capacity of data receiving on 1 DL while supporting simultaneous sending on 2 UL. For example, in case that the user equipment sends the transmission capacity that supports simultaneous data sending on the 1000 MHz frequency band and the 1100 MHz frequency band and data receiving on the 1000 MHz frequency band, it can be understood that when the user equipment sends data simultaneously on the 1000 MHz frequency band and the 1100 MHz frequency band, the user equipment also supports data receiving on the 1000 MHz frequency band, but does not support data receiving on the 1100 MHz frequency band.

In an example, the first signaling may be an original UECapabilityEnquiry signaling. A third signaling requestedFrequencyBands-r15 is added to the first signaling to instruct the user equipment to send the instruction information of transmission capacity on a combination of different frequency bands and the transmission capacity of a combination of all the frequency bands it supports. In an example, the third signaling may carry a frequency band list, instructing the user equipment to select the transmission capacity of the supported combination of different frequency bands in the frequency band list.

In step 102, the second signaling is sent.

In an exemplary scenario, as shown in FIG. 1B, a primary base station LTE base station 10, a secondary base station 5G base station 20, and a user equipment 30 are deployed in a NSA scenario. The LTE base station 10 and/or the 5G base station 20 may acquire the wireless transmission capacity of the user equipment 30 firstly when configuring a wireless communication link for the UE, and acquire the transmission capacity of the user equipment 30 on a combination of different frequency bands by sending a user equipment capability enquiry signaling to the user equipment 30, thereby determining on which combination of frequency bands the user equipment 30 does not generate intermodulation interference when sending data, and configuring the user equipment 30 with at least one of time resource and frequency resource that do not generate intermodulation interference, which improves the data transmission performance of the user equipment 30.

In this example, through the above steps 101 to 102, the base station acquires the transmission capacity of the user equipment on a combination of different frequency bands by sending the user equipment capability enquiry signaling to the user equipment, thereby determining on which combination of frequency bands the user equipment does not generate intermodulation interference when sending data, and configuring the user equipment with at least one of time resource and frequency resource that do not generate intermodulation interference, which improves the data transmission performance of the user equipment.

The following describes the technical solutions provided by the examples of the present disclosure with examples.

Figure 2:
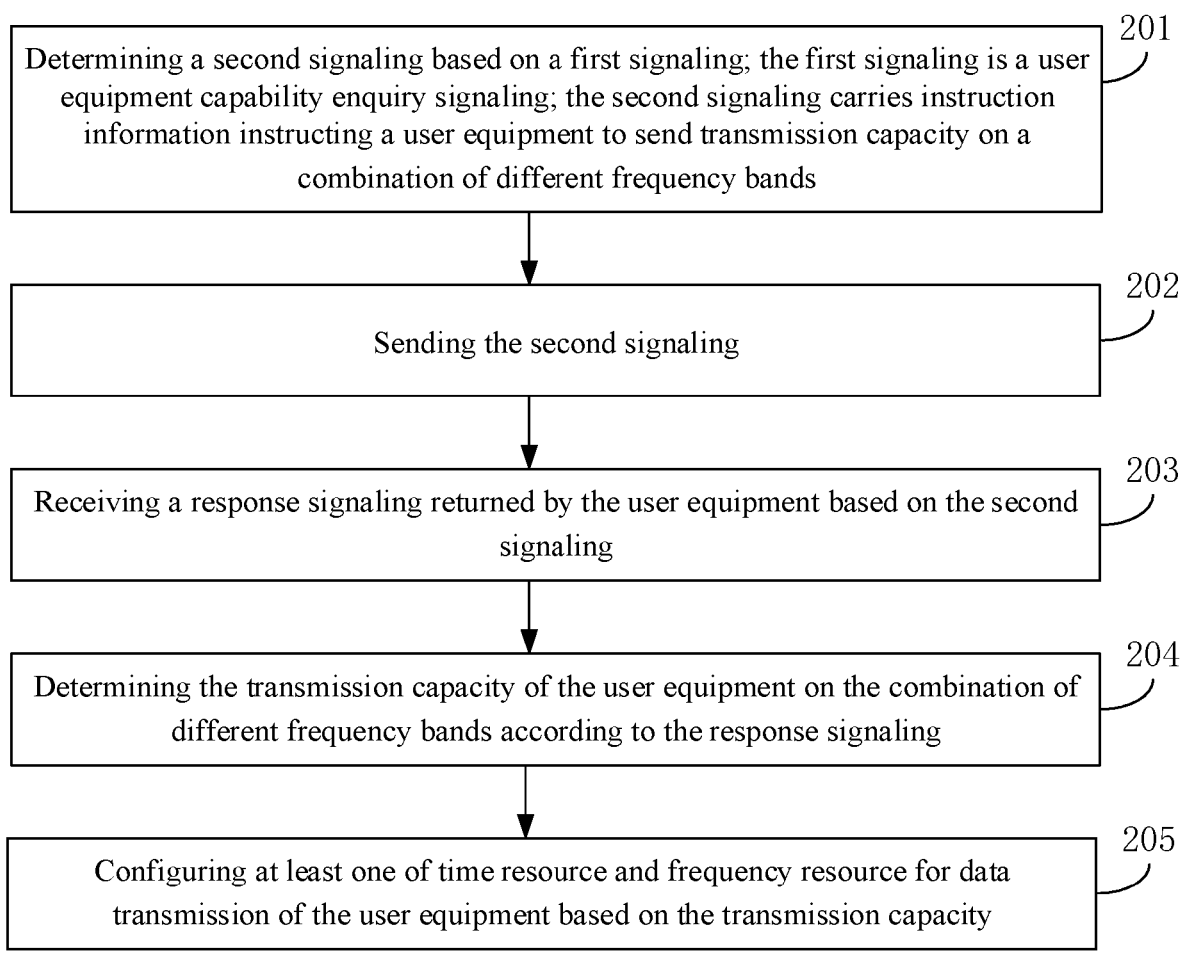
FIG. 2 is a flowchart of another method for eliminating intermodulation interference according to an example.

FIG. 2 is a flowchart of another method for eliminating intermodulation interference according to an example. The example uses the foregoing method provided in the example of the present disclosure to give an exemplary description by using a base station to configure at least one of time resource and frequency resource for user equipment based on the acquired transmission capacity of the user equipment. As shown in FIG. 2, the method includes the following steps.

In step 201, a second signaling is determined based on a first signaling. The first signaling is a user equipment capability enquiry signaling, and the second signaling carries instruction information instructing a user equipment to send transmission capacity on a combination of different frequency bands.

In step 202, the second signaling is sent.

In an example, the description of step 201 and step 202 can be referred to the description of step 101 and step 102 in the example shown in FIG. 1A, which is not described in detail herein again.

In step 203, a response signaling returned by the user equipment based on the second signaling is received.

In an example, after sending the second signaling, the base station may receive a network capability UE-EUTRA-Capability signaling supported by the user equipment and returned by the user equipment.

In step 204, the transmission capacity of the user equipment on the combination of different frequency bands is determined according to the response signaling.

In step 205, at least one of time resource and frequency resource are configured for data transmission of the user equipment based on the transmission capacity.

In steps 204 and 205, based on the transmission capacity on a combination of different frequency bands sent by the user equipment, it can be determined on which combination of frequency bands the user equipment does not generate intermodulation interference when sending data simultaneously, thereby when in need, configuring the user equipment with at least one of time resource and frequency resource that do not generate intermodulation interference. For example, in case that the user equipment only sends the transmission capacity of supporting simultaneous sending on 2 UL, it can be understood that the user equipment also supports the ability of simultaneous data receiving on this combination. In case that the amount of data to be transmitted of the user equipment is relatively large or the delay tolerance of the data to be transmitted is relatively low, at least one of time resource and frequency resource for sending data simultaneously on the 1000 MHz frequency band and the 1100 MHz frequency band can be configured for the user equipment, and data can be sent to the user equipment simultaneously on the 1000 MHz frequency band and the 1100 MHz frequency band. In case that the user equipment sends the transmission capacity of the ability to support 2 UL+1 DL, it can be understood that the user equipment supports the transmission capacity of receiving data on 1 DL when sending simultaneously on 2 UL. For example, in case that the user equipment sends transmission capacity that supports simultaneous data sending on the 1000 MHz frequency band and the 1100 MHz frequency band and data receiving on the 1000 MHz frequency band, the user equipment can be configured with at least one of time resource and frequency resource for simultaneous data sending on the 1000 MHz frequency band and the 1100 MHz frequency band and data can be sent simultaneously to the user equipment on the 1000 MHz frequency band.

In this example, based on the response signaling returned by the user equipment, the base station can determine on which combination of frequency bands the user equipment does not generate intermodulation interference when sending data, and thus when it is needed to configure at least one of time resource and frequency resource on a plurality of frequency bands for the user equipment, select to allocate at least one of time resource and frequency resource on a combination of frequency bands that do not generate intermodulation interference, so that the base station can configure the at least one of time resource and frequency resource of the user equipment correctly, which improves the data transmission performance of the user equipment.

Figure 3:
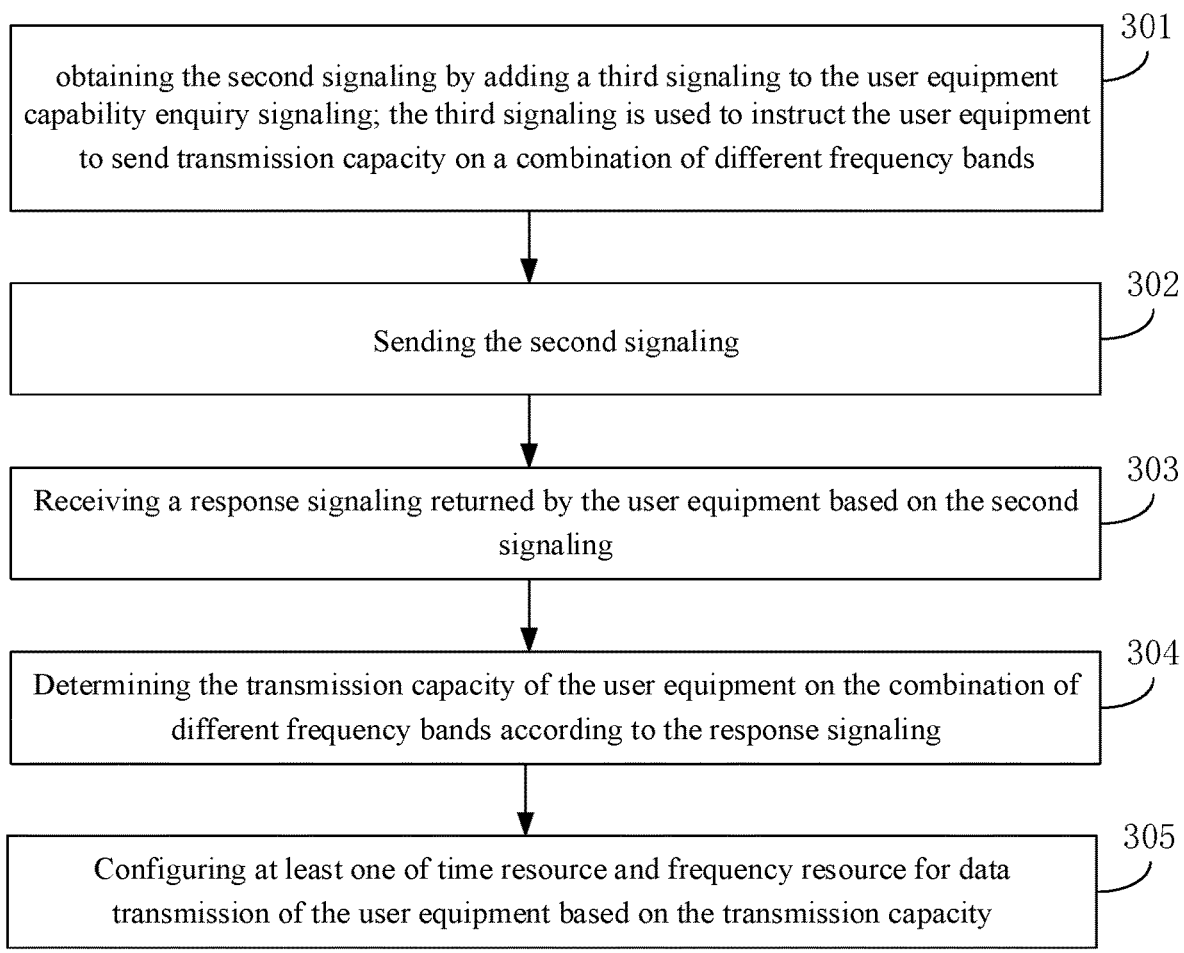
FIG. 3 is a flowchart of still another method for eliminating intermodulation interference according to an example.

FIG. 3 is a flowchart of still another method for eliminating intermodulation interference according to an example. This example uses the foregoing method provided in the example of the present disclosure, and takes how a base station generates a second signaling as an example for exemplary description. As shown in FIG. 3, the method includes the following steps.

In step 301, a third signaling is added to the user equipment capability enquiry signaling to obtain the second signaling, in which the third signaling is used to instruct the user equipment to send transmission capacity on a combination of different frequency bands.

In an example, the second signaling may be obtained by adding a third signaling requestedFrequencyBands-r15 to the original UECapabilityEnquiry signaling.

In an example, the third signaling may instruct the user equipment to send transmission capacity on a combination of different frequency bands, and the user equipment may send a combination of all frequency bands that can be sent simultaneously based on the transmission capacity on a combination of different frequency bands measured during a network access test.

In an example, the third signaling may further include a frequency band list, and two or more frequency bands are recorded in the frequency band list, instructing the user equipment to select a frequency bands that supports simultaneous sending among the frequency bands recorded in the frequency band list.

In step 302, the second signaling is sent.

In step 303, a response signaling returned by the user equipment based on the second signaling is received.

In step 304, the transmission capacity of the user equipment on the combination of different frequency bands is determined according to the response signaling.

In step 305, at least one of time resource and frequency resource are configured for data transmission of the user equipment based on the transmission capacity.

In an example, the description of steps 303 to 305 can be referred to the description of steps 203 to 205 in the example shown in FIG. 2, which is not described in detail herein again.

In this example, an implementation for instructing the user equipment to send transmission capacity is disclosed. The base station may instruct the user equipment to send transmission capacity by adding a signaling to the original UE capability enquiry signaling, thereby acquiring the transmission capacity of the user equipment on a combination of different frequency bands.

Figure 4:
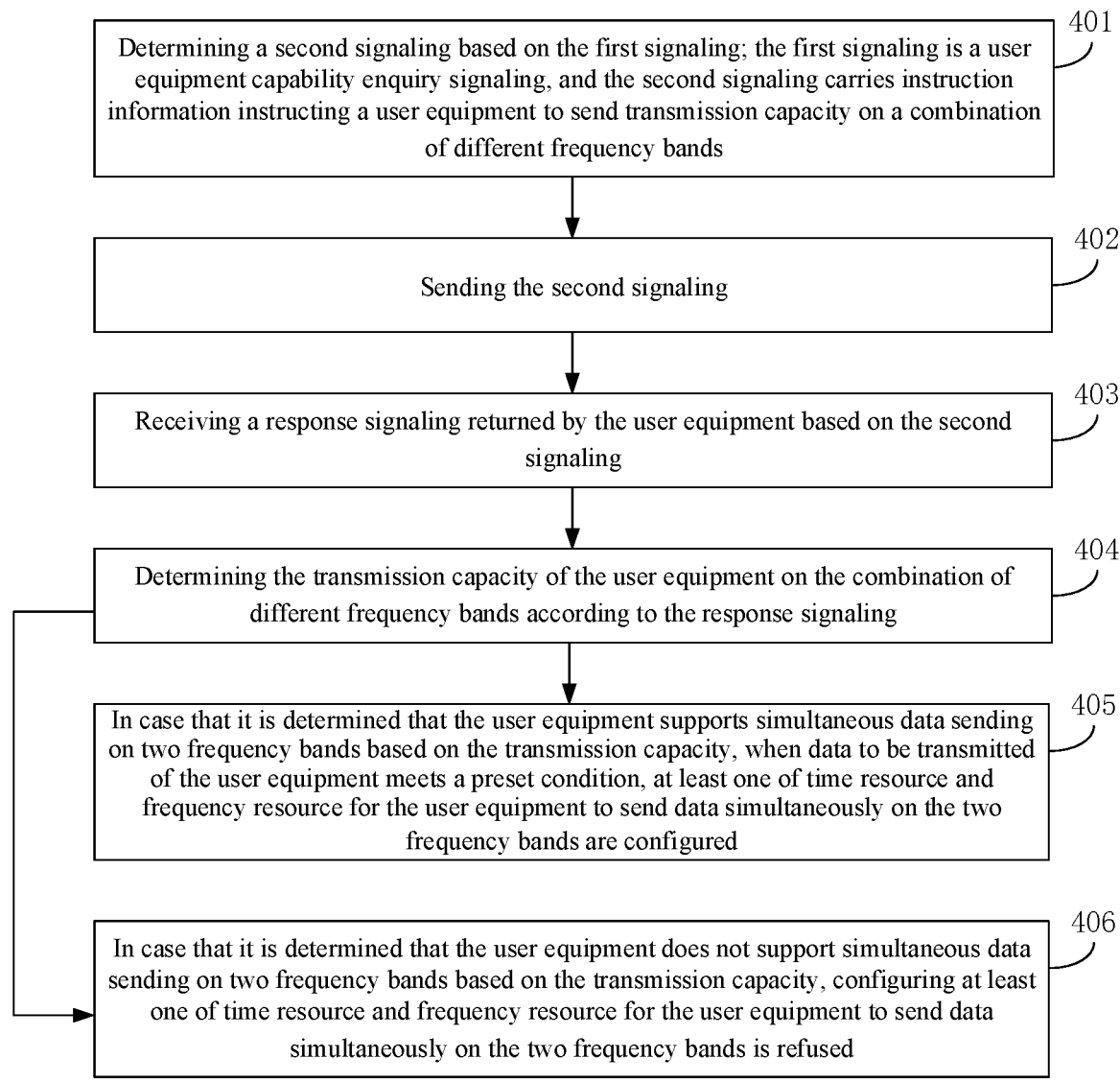
FIG. 4 is a flowchart of still another method for eliminating intermodulation interference according to an example.

FIG. 4 is a flowchart of still another method for eliminating intermodulation interference according to an example. This example uses the foregoing method provided in the example of the present disclosure, and takes how a base station configures at least one of time resource and frequency resource for a user equipment as an example for exemplary description. As shown in FIG. 4, the method includes the following steps.

In step 401, a second signaling is determined based on the first signaling. The first signaling is a user equipment capability enquiry signaling, and the second signaling carries instruction information instructing a user equipment to send transmission capacity on a combination of different frequency bands.

In step 402, the second signaling is sent.

In step 403, a response signaling returned by the user equipment based on the second signaling is received.

In step 404, the transmission capacity of the user equipment on the combination of different frequency bands is determined according to the response signaling, and step 405 or step 406 is executed.

In an example, the description of steps 401 to 404 can be referred to the description of steps 201 to 204 in the example shown in FIG. 2, which is not described in detail herein again.

In step 405, in case that it is determined that the user equipment supports simultaneous data sending on two frequency bands based on the transmission capacity, when data to be transmitted of the user equipment meets a preset condition, at least one of time resource and frequency resource for the user equipment to send data simultaneously on the two frequency bands are configured.

In an example, the data to be transmitted of the user equipment meets the preset condition can be understood that the amount of data to be transmitted of the user equipment is relatively large or the data type of the data to be transmitted is an emergency service, a high priority service, or a service with low delay tolerance, and the base station can configure simultaneous data sending on two frequency bands for the user equipment to improve data transmission efficiency.

In step 406, in case that it is determined that the user equipment does not support simultaneous data sending on two frequency bands based on the transmission capacity, configuring at least one of time resource and frequency resource for the user equipment to send data simultaneously on the two frequency bands is refused.

In this example, based on the transmission capacity of the user equipment on a combination of different frequency bands, the base station can configure the user equipment with correct at least one of time resource and frequency resource to improve the data transmission performance of the user equipment.

Figure 5:
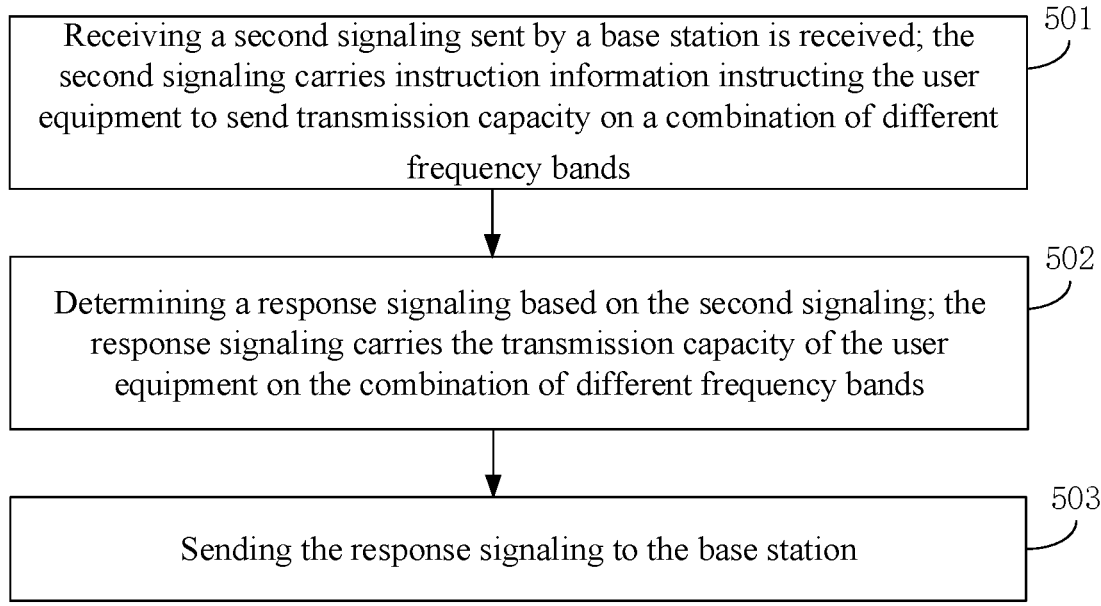
FIG. 5 is a flowchart illustrating a method for eliminating intermodulation interference according to an example.

FIG. 5 is a flowchart of still another method for eliminating intermodulation interference according to an example. The method for eliminating intermodulation interference may be applied to a user equipment. As shown in FIG. 5, the method for eliminating intermodulation interference includes the following steps 501-503.

In step 501, a second signaling sent by a base station is received. The second signaling carries instruction information instructing the user equipment to send transmission capacity on a combination of different frequency bands.

In an example, the second signaling may be a UECapabilityEnquiry signaling carrying instruction information instructing the user equipment to send transmission capacity on a combination of different frequency bands.

In step 502, a response signaling is determined based on the second signaling. The response signaling carries the transmission capacity of the user equipment on the combination of different frequency bands.

In an example, the response signaling may be a network capability UE-EUTRA-Capability signaling supported by the UE. For the implementation of determining the response signaling based on the second signaling can be referred to the examples shown in FIG. 6 and FIG. 7, which is not described in detail here.

In an example, the transmission capacity of the user equipment on the combination of different frequency bands may be instructed in a radio frequency parameter RF-Parameters-r15 signaling in the network capability UE-EUTRA-Capability signaling supported by the UE, and the response signaling can be implemented with reference to the following code:

```
UE-EUTRA-Capability-v15-IEs ::= SEQUENCE {
Network capability supported by user equipment
        rf-Parameters-v15            RF-Parameters-v15    OPTIONAL,
    RF parameters
        nonCriticalExtension         SEQUENCE { }
OPTIONAL
    Non-critical extension
}
RF-Parameters-v15 ::=                        SEQUENCE {
RF parameters
        supportedBandCombination-v15    SupportedBandCombination-v15
    Supported frequency band combinations
                    OPTIONAL
}
SupportedBandCombination-v15 ::= SEQUENCE (SIZE (1..maxBandComb-r15)) OF
    Supported frequency band combinations            Maximum number of frequency
band combinations
    BandCombinationParameters-v15
    Frequency band combination parameters
    BandCombinationParameters-r15 ::= SEQUENCE {
    Frequency band combination parameters
        bandParameterList-r15         SEQUENCE (SIZE (1..maxSimultaneousBands-
r10)) OF
        Frequency band combination list       Maximum number of simultaneous
sending frequency bands
            BandParameters-r15,
            Frequency band parameters
            simultaneousUL-r15          ENUMERATED {supported}
OPTIONAL,
            Simultaneous sending
            ...
        }
```

In an example, the number of frequency bands supporting simultaneous sending may be two or more.

In step 503, the response signaling is sent to the base station.

In an example, the response signaling may be sent to a primary base station and/or a secondary base station. When receiving the second signaling sent by the primary base station, the response signaling may be sent to the primary base station, and upon receiving the second signaling sent by the secondary base station, the response signaling may be returned to the secondary base station.

In an exemplary scenario, as shown in FIG. 1B, a primary base station LTE base station 10, a secondary base station 5G base station 20, and a user equipment 30 are deployed in the NSA scenario. After receiving the second signaling sent by the LTE base station 10 and/or the 5G base station 20, the user equipment 30 may determine the transmission capacity on a combination of different frequency bands and return a response signaling, so that the base station configures the user equipment 30 with at least one of time resource and frequency resource that do not generate intermodulation interference when acquiring on which combination of frequency bands the user equipment 30 does not generate intermodulation interference when sending data, which improves the data transmission performance of the user equipment 30.

In this example, through the above steps 501 to 503, after receiving the second signaling sent by the base station, the user equipment can send the transmission capacity on the combination of different frequency bands to the base station, so that the base station can configure at least one of time resource and frequency resource for the user equipment on the combination of frequency bands which does not generate intermodulation interference, which improves data transmission performance of the user equipment.

Figure 6:
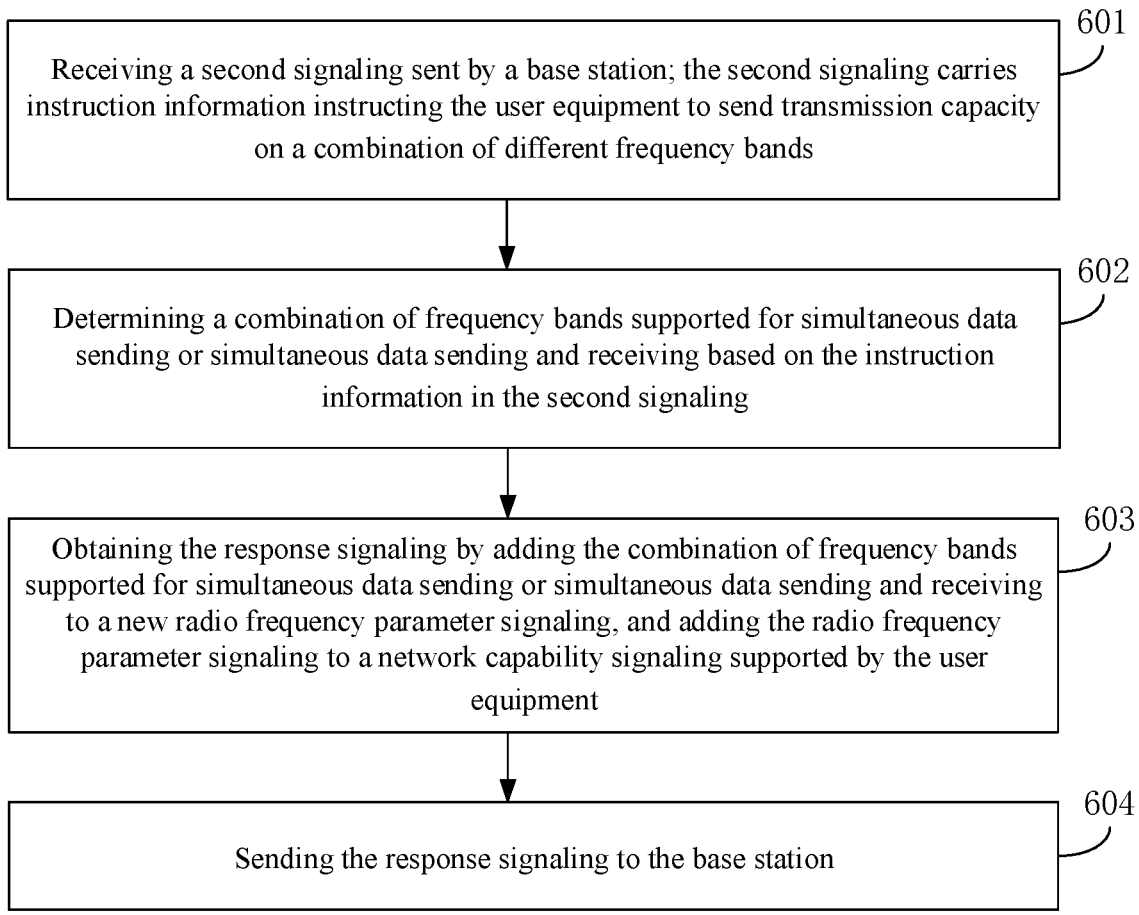
FIG. 6 is a flowchart of still another method for eliminating intermodulation interference according to an example.

FIG. 6 is a flowchart of still another method for eliminating intermodulation interference according to an example. This example uses the foregoing method provided in the example of the present disclosure, and takes how a user equipment determines a response signaling as an example for exemplary description. As shown in FIG. 6, the method includes the following steps.

In step 601, a second signaling sent by a base station is received. The second signaling carries instruction information instructing the user equipment to send transmission capacity on a combination of different frequency bands.

In step 602, based on the instruction information in the second signaling, a combination of frequency bands supported for simultaneous data sending or simultaneous data sending and receiving is determined.

In an example, in case that the user equipment sends data simultaneously on different frequency bands in a combination and also supports simultaneous data receiving on each frequency band in the combination, the combination of frequency bands that support simultaneous data sending can be sent directly. For example, when the user equipment supports simultaneous data sending on the 820 MHz frequency band and the 920 MHz frequency band, and also supports data receiving on the 820 MHz frequency band and the 920 MHz frequency band when simultaneous data sending on the 820 MHz frequency band and 920 MHz frequency band, a combination of 2 UL frequency bands may be sent.

In an example, in case that the user equipment sends data simultaneously on different frequency bands in a combination, and also supports receiving data simultaneously on some frequency bands in this combination, but does not support receiving data simultaneously on other frequency bands in the combination, the combination of frequency bands for simultaneous data sending and receiving can be directly sent. For example, the user equipment supports simultaneous data sending on the 820 MHz frequency band and the 920 MHz frequency band, and also supports data receiving on the 920 MHz frequency band when sending data simultaneously on the 820 MHz frequency band and the 920 MHz frequency band, but do not support data receiving on the 820 MHz frequency band, a combination of 2 UL+1 DL frequency bands can be sent.

In step 603, the combination of frequency bands supported for simultaneous data sending or simultaneous data sending and receiving is added to a new radio frequency parameter signaling, and the radio frequency parameter signaling is added to a network capability signaling supported by the user equipment, to obtain the response signaling.

In step 604, the response signaling is sent to the base station.

In this example, the user equipment may send a combination of frequency bands in a corresponding format, such as a combination of a 2 UL frequency bands or a combination of a 2 UL+1 DL frequency bands, based on the transmission capacity on the combination of different frequency bands supported by itself, so that the base station allocates at least one of time resource and frequency resource to the user equipment on the corresponding combination of frequency bands.

Figure 7:
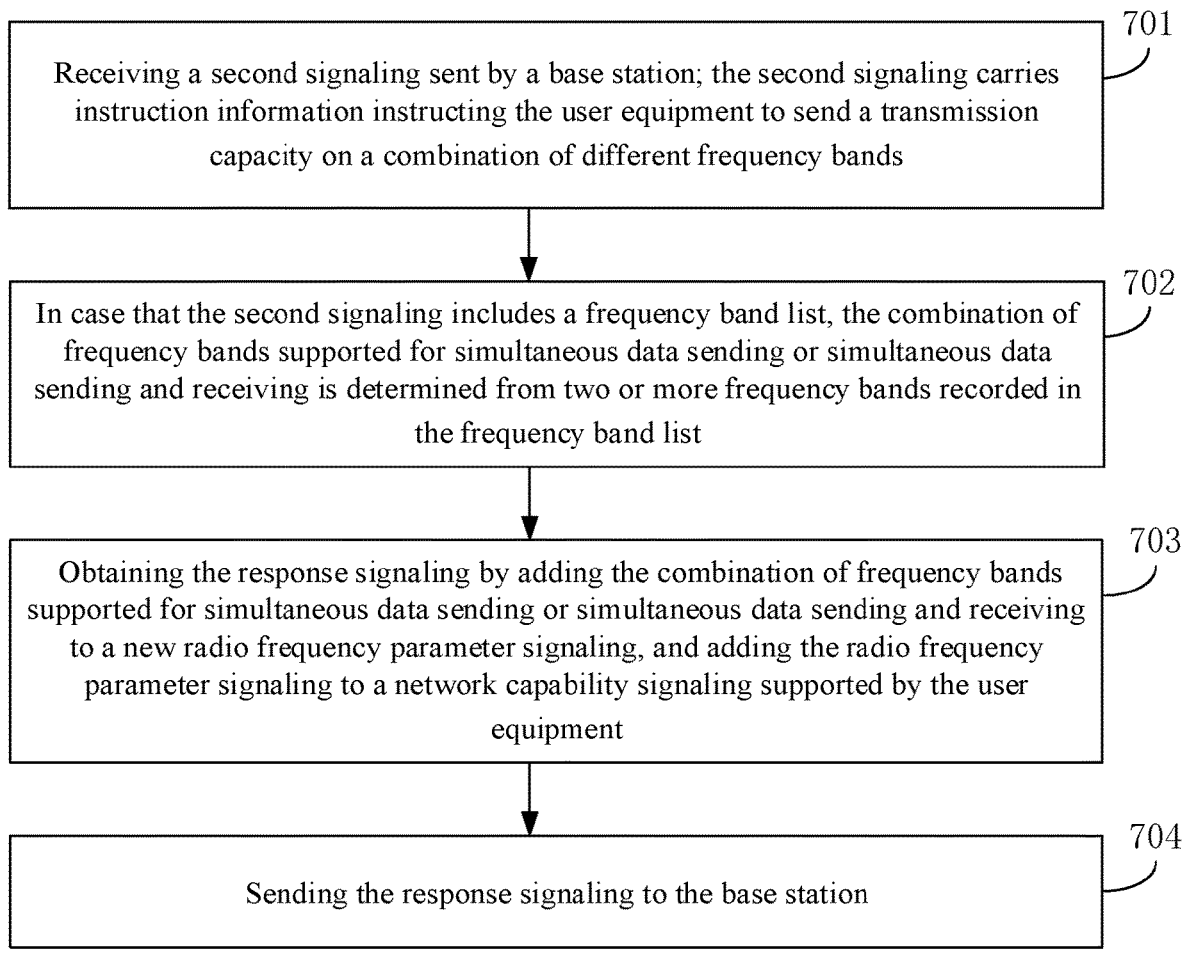
FIG. 7 is a flowchart of still another method for eliminating intermodulation interference according to an example.

FIG. 7 is a flowchart of still another method for eliminating intermodulation interference according to an example. This example uses the foregoing method provided in the example of the present disclosure to take how a user equipment determines a response signaling as an example for exemplary description. As shown in FIG. 7, the method includes the following steps.

In step 701, a second signaling sent by a base station is received. The second signaling carries instruction information instructing the user equipment to send a transmission capacity on a combination of different frequency bands.

In step 702, in case that the second signaling includes a frequency band list, the combination of frequency bands supported for simultaneous data sending or simultaneous data sending and receiving is determined from two or more frequency bands recorded in the frequency band list.

In an example, in case that the second signaling includes a frequency band list, a combination of frequency bands supporting simultaneous sending or simultaneous data sending and receiving may be selected from the frequency bands recorded in the frequency band list. For example, 820 MHz frequency band, 920 MHz frequency band, and 1000 MHz frequency band are recorded in the frequency band list, the user equipment neither supports simultaneous sending on the 920 MHz frequency band and the 1000 MHz frequency band, nor supports simultaneous sending on the 820 MHz frequency band and the 1000 MHz frequency band, only supports simultaneous sending on the 820 MHz frequency band and the 920 MHz frequency band, and also supports receiving data on the 920 MHz frequency band when sending data simultaneously on the 820 MHz frequency band and the 920 MHz frequency band, but does not support receiving data on the 820 MHz frequency band, then the transmission capacity of sending on the 820 MHz frequency band and the 920 MHz frequency band simultaneously and data receiving on the 920 MHz band supported by the user equipment is sent.

In step 703, the combination of frequency bands supported for simultaneous data sending or simultaneous data sending and receiving is added to a new radio frequency parameter signaling, and the radio frequency parameter signaling is added to a network capability signaling supported by the user equipment, to obtain the response signaling.

In step 704, the response signaling is sent to the base station.

In this example, the user equipment can determine, based on the frequency bands recorded in the frequency band list, a frequency band that does not generate intermodulation interference in the frequency bands specified by the base station, so that the base station allocates at least one of time resource and frequency resource to the user equipment on the combination of corresponding frequency bands.

Figure 8:
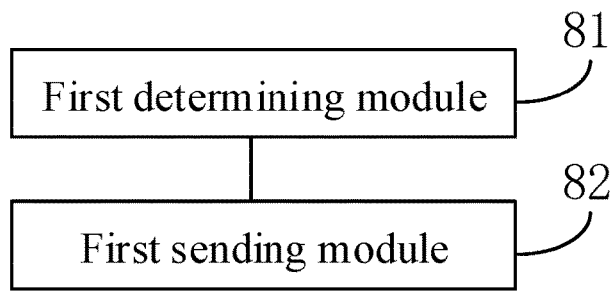
FIG. 8 is a block diagram of an apparatus for eliminating intermodulation interference according to an example.

FIG. 8 is a block diagram of an apparatus for eliminating intermodulation interference according to an example, which is applied to a base station. As shown in FIG. 8, the apparatus for eliminating intermodulation interference includes:

a first determining module 81 configured to determine a second signaling based on a first signaling, in which the first signaling is a user equipment capability enquiry signaling, and the second signaling carries instruction information instructing a user equipment to send transmission capacity on a combination in different frequency bands; and a first sending module 82 configured to send the second signaling determined by the first determining module 81.

In this example, when the base station needs to configure a wireless communication link for the user equipment, a user equipment capability enquiry signaling can be sent to the user equipment to obtain the transmission capacity of the user equipment on the combination of different frequency bands, thereby configuring the user equipment with at least one of time resource and frequency resource that do not generate intermodulation interference.

Figure 9:
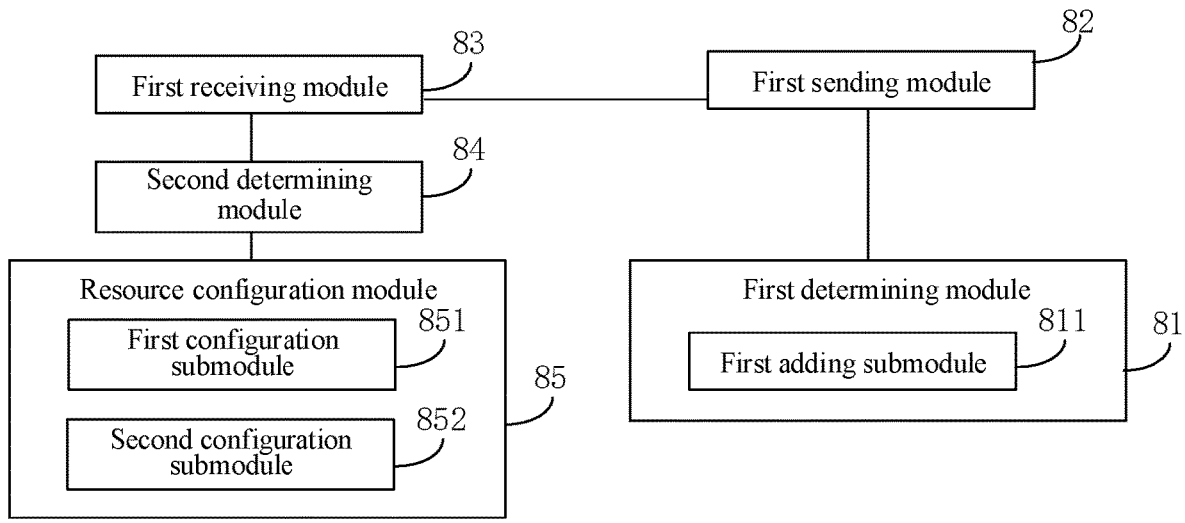
FIG. 9 is a block diagram of another apparatus for eliminating intermodulation interference according to an example.

FIG. 9 is a block diagram of another apparatus for eliminating intermodulation interference according to an example. As shown in FIG. 9, based on the example shown in FIG. 8 described above, in an example, the first determining module 81 includes:

a first adding submodule 811 configured to add a third signaling to the user equipment capability enquiry signaling to obtain the second signaling, in which the third signaling is used to instruct the user equipment to send transmission capacity on a combination of different frequency bands.

In this example, an implementation for instructing the user equipment to send transmission capacity is disclosed. The base station may instruct the user equipment to send transmission capacity by adding a signaling to the original UE capability enquiry signaling, thereby acquiring the transmission capacity of the user equipment on a combination of different frequency bands.

In an example, the third signaling includes a frequency band list, and two or more frequency bands are recorded in the frequency band list.

In this example, by carrying a frequency band list, the base station may instruct the user equipment to select a combination of frequency bands that does not generate intermodulation interference in the frequency bands specified by itself.

In an example, the apparatus further includes:

a first receiving module 83 configured to receive a response signaling returned by the user equipment based on the second signaling;

a second determining module 84 configured to determine the transmission capacity of the user equipment on the combination of different frequency bands according to the response signaling; and a resource configuration module 85 configured to configure at least one of time resource and frequency resource for data transmission of the user equipment based on the transmission capacity.

In this example, based on the response signaling returned by the user equipment, the base station can determine on which combination of frequency bands the user equipment does not generate intermodulation interference when sending data and thus when it is needed to configure at least one of time resource and frequency resource on a plurality of frequency bands for the user equipment, select to allocate at least one of time resource and frequency resource on a combination of frequency bands that do not generate intermodulation interference, so that the base station can configure the at least one of time resource and frequency resource of the user equipment correctly, which improves the data transmission performance of the user equipment.

In an example, the resource configuration module 85 includes:

a first configuration submodule 851 configured to configure at least one of time resource and frequency resource for the user equipment to send data simultaneously on the two frequency bands when data to be transmitted of the user equipment meets a preset condition, in case that it is determined that the user equipment supports simultaneous data sending on two frequency bands based on the transmission capacity; and a second configuration submodule 852 configured to refuse to configure at least one of time resource and frequency resource for the user equipment to send data simultaneously on the two frequency bands, in case that it is determined that the user equipment does not support simultaneous data sending on two frequency bands based on the transmission capacity.

In this example, based on the transmission capacity of the user equipment on a combination of different frequency bands, the base station can configure the correct at least one of time resource and frequency resource for the user equipment when the data to be transmitted by the user equipment meets a preset condition, thereby improving data transmission performance of the user equipment.

In an example, the transmission capacity on the combination of different frequency bands includes:

the ability to support simultaneous data sending on the combination of different frequency bands; or the ability to support simultaneous data sending and receiving on the combination of different frequency bands.

In this example, a mode for instructing the user equipment to send transmission capacity is disclosed. The transmission capacity of the user equipment is indicated by sending the ability to support simultaneous data sending on combination of different frequency bands, or by sending the ability to support simultaneous data sending and receiving on combination of different frequency bands.

Figure 10:
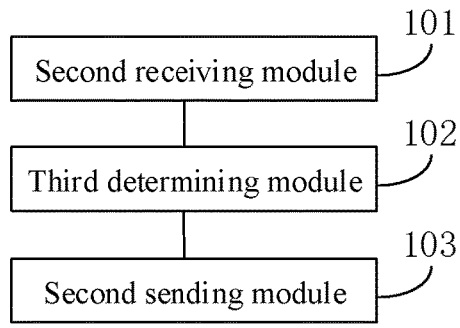
FIG. 10 is a block diagram of an apparatus for eliminating intermodulation interference according to an example.

FIG. 10 is a block diagram of an apparatus for eliminating intermodulation interference according to an example. The apparatus is applied to a user equipment. As shown in FIG. 10, the apparatus for eliminating intermodulation interference includes:

a second receiving module 101 configured to receive a second signaling sent by the base station, in which the second signaling carries instruction information instructing the user equipment to send transmission capacity on a combination of different frequency bands;

a third determining module 102 configured to determine a response signaling based on the second signaling received by the second receiving module, in which the response signaling carries the transmission capacity of the user equipment on the combination of different frequency bands; and a second sending module 103 configured to send the response signaling determined by the third determining module to the base station.

In this example, after receiving the second signaling sent by the base station, the user equipment may send the transmission capacity on the combination of different frequency bands to the base station, so that the base station may configure at least one of time resource and frequency resource for the user equipment on a combination of frequency bands that do not generate intermodulation interference, which improves the data transmission performance of the user equipment.

Figure 11:
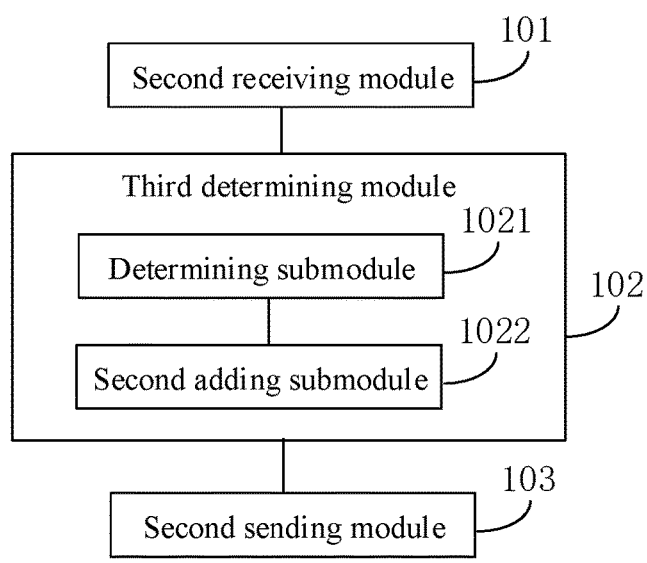
FIG. 11 is a block diagram of another apparatus for eliminating intermodulation interference according to an example.

FIG. 11 is a block diagram of another apparatus for eliminating intermodulation interference according to an example. As shown in FIG. 11, based on the example shown in FIG. 10 above, in an example, the third determining module 102 includes:

a determining submodule 1021 configured to determine, based on the instruction information in the second signaling, a combination of frequency bands supported for simultaneous data sending or a combination for simultaneous data sending and receiving;

a second adding submodule 1022 configured to add the combination of frequency bands supported for simultaneous data sending or simultaneous data sending and receiving to a new radio frequency parameter signaling, and add the radio frequency parameter signaling to a network capability signaling supported by the user equipment, to obtain response signaling.

In this example, the user equipment may send a combination of frequency bands in a corresponding format, such as a combination of 2 UL frequency bands or a combination of 2 UL+1 DL frequency bands, based on the transmission capacity of the combination on different frequency bands supported by the user equipment, so that the base station allocates at least one of time resource and frequency resource to the user equipment on a combination of corresponding frequency bands.

In an example, the determining submodule 1021 is configured to determine, in case that the second signaling includes a frequency band list, the combination of frequency bands supported for simultaneous data sending or simultaneous data sending and receiving from two or more frequency bands recorded in the frequency band list.

In this example, based on the frequency bands recorded in the frequency band list, the user equipment can determine a frequency band that does not generate intermodulation interference in the frequency bands specified by the base station, so that the base station allocates at least one of time resource and frequency resource to the user equipment on the combination of corresponding frequency bands.

In an example, the transmission capacity of the user equipment on the combination of different frequency bands includes:

the ability of the user equipment to support simultaneous data sending on the combination of different frequency bands; or, the ability of the user equipment to support simultaneous data sending and receiving on the combination of different frequency bands.

In this example, a mode for instructing the user equipment to send transmission capacity is disclosed. The transmission capacity of the user equipment is indicated by sending the ability to support simultaneous data sending on a combination of different frequency bands, or by sending the ability to support simultaneous data sending and receiving on combination of different frequency bands.

Figure 12:
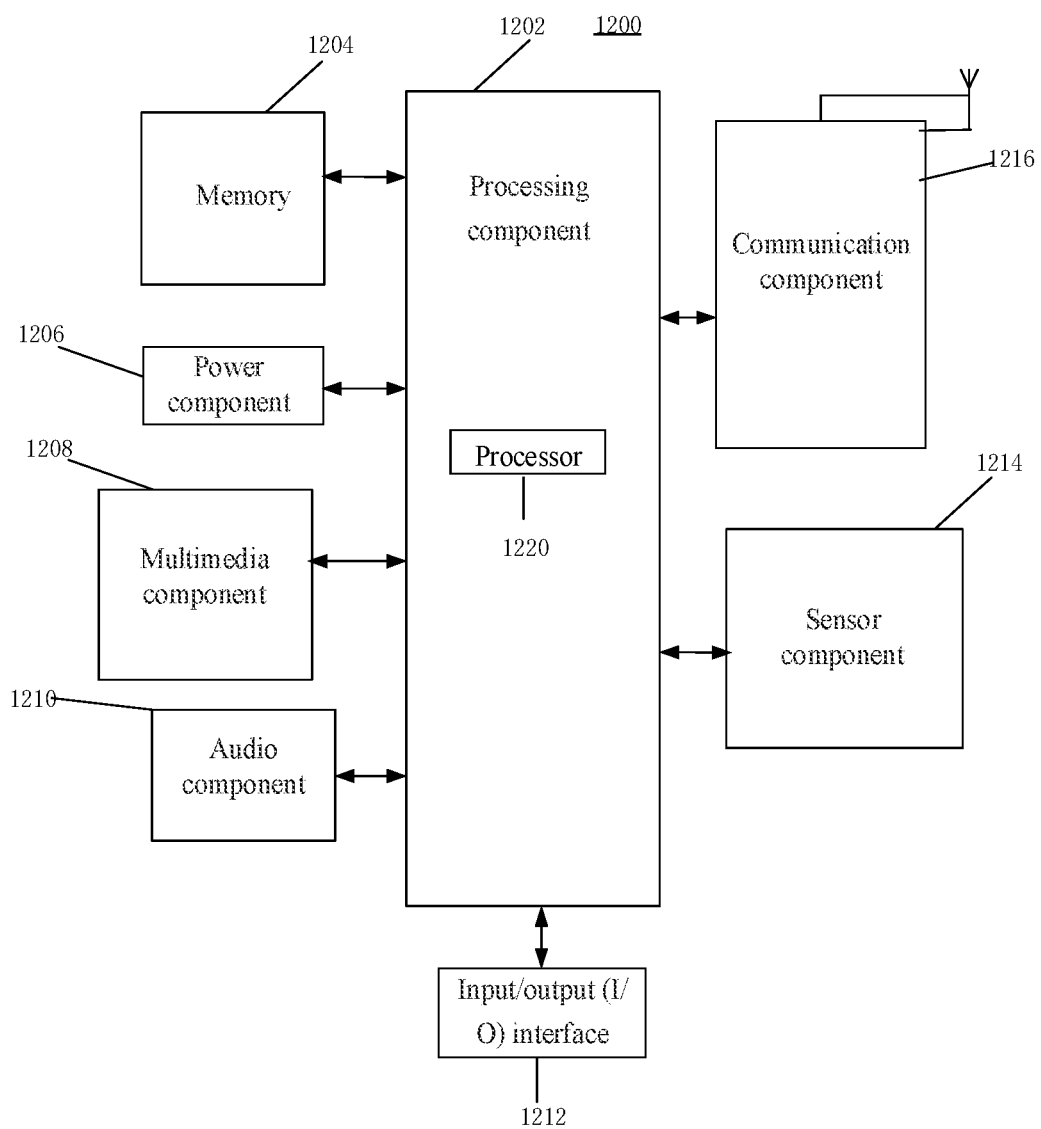
FIG. 12 is a block diagram of an apparatus suitable for eliminating intermodulation interference according to an example.

FIG. 12 is a block diagram of an apparatus suitable for eliminating intermodulation interference according to an example. For example, the apparatus 1200 may be a mobile phone, a computer, a digital broadcast terminal, a message transceiver device, a game console, a tablet device, a piece of medical equipment, a piece of fitness equipment, a personal digital assistant, and the like.

Referring to FIG. 12, the apparatus 1200 may include one or more of the following components: a processing component 1202, a memory 1204, a power component 1206, a multimedia component 1208, an audio component 1210, an input/output (I/O) interface 1212, a sensor component 1214, and a communication component 1216.

The processing component 1202 typically controls overall operations of the apparatus 1200, such as the operations associated with display, telephone calls, data communications, camera operations, and recording operations. The processing component 1202 may include one or more processors 1220 to execute instructions to perform all or part of the steps in the above described methods. Moreover, the processing component 1202 may include one or more modules which facilitate the interaction between the processing component 1202 and other components. For instance, the processing component 1202 may include a multimedia module to facilitate the interaction between the multimedia component 1208 and the processing component 1202.

The memory 1204 is configured to store various types of data to support the operation of the apparatus 1200. Examples of such data include instructions for any applications or methods operated on the intermodulation interference eliminating apparatus 1200, contact data, phonebook data, messages, pictures, video, etc. The memory 1204 may be implemented using any type of volatile or non-volatile memory devices, or a combination thereof, such as a static random-access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 1206 provides power to various components of the apparatus 1200. The power component 1206 may include a power management system, one or more power sources, and any other components associated with the generation, management, and distribution of power in the apparatus 1200.

The multimedia component 1208 includes a screen providing an output interface between the apparatus 1200 and the user. In some examples, the screen may include a liquid crystal display (LCI)) and a touch panel (TP). In case that the screen includes the touch panel, the screen may be implemented as a touch screen to receive input signals from the user. The touch panel includes one or more touch sensors to sense touches, slips, and gestures on the touch panel. The touch sensors may not only sense a boundary of a touch or slip action, but also sense a period of time and a pressure associated with the touch or slip action. In some examples, the multimedia component 1208 includes a front camera and/or a rear camera. The front camera and/or the rear camera may receive an external multimedia datum while the apparatus 1200 is in an operation mode, such as a photographing mode or a video mode. Each of the front camera and the rear camera may be a fixed optical lens system or have focus and optical zoom capability.

The audio component 1210 is configured to output and/or input audio signals. For example, the audio component 1210 includes a microphone ("MIC") configured to receive an external audio signal when the apparatus 1200 is in an operation mode, such as a call mode, a recording mode, and a voice recognition mode. The received audio signal may be further stored in the memory 1204 or transmitted via the communication component 1216. some examples, the audio component 1210 further includes a speaker to output audio signals.

The I/O interface 1212 provides an interface between the processing component 1202 and peripheral interface modules, such as a keyboard, a click wheel, buttons, and the like. The buttons may include, but are not limited to, a home button, a volume button, a starting button, and a locking button.

The sensor component 1214 includes one or more sensors to provide status assessments of various aspects of the apparatus 1200. For instance, the sensor component 1214 may detect an open/closed status of the apparatus 1200, relative positioning of components, e.g., the display and the keypad, of the apparatus 1200, a change in position of the apparatus 1200 or a component of the intermodulation interference eliminating apparatus 1200, a presence or absence of user contact with the apparatus 1200, an orientation or an acceleration/deceleration of the apparatus 1200, and a change in temperature of the apparatus 1200. The sensor component 1214 may include a proximity sensor configured to detect the presence of nearby objects without any physical contact. The sensor component 1214 may also include a light sensor, such as a complementary metal oxide semiconductor (CMOS) or charge-coupled device (CCD) image sensor, for use in imaging applications. In some examples, the sensor component 1214 may also include an accelerometer sensor, a gyroscope sensor, a magnetic sensor, a pressure sensor, or a temperature sensor.

The communication component 1216 is configured to facilitate communication, wired or wirelessly, between the apparatus 1200 and other devices. The apparatus 1200 can access a wireless network based on a communication standard, such as Wi-Fi, 2G, or 3G, or a combination thereof. In one example, the communication component 1216 receives a broadcast signal or broadcast associated information from an external broadcast management system via a broadcast channel. In one example, the communication component 1216 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In examples, the apparatus 1200 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components for executing the above methods.

In examples, there is also provided a non-transitory computer readable storage medium including instructions, such as the memory 1204 including instructions. These instructions may be loaded and executed by the processor 1220 in the apparatus 1200 for executing the method described in the above second aspect: receiving a second signaling sent by a base station, in which the second signaling carries instruction information instructing a user equipment to send transmission capacity on a combination of different frequency bands; determining a response signaling based on the second signaling, in which the response signaling carries the transmission capacity of the user equipment on the combination of different frequency bands; and sending the response signaling to the base station.

In one example, the non-transitory computer-readable storage medium may be a ROM, a RAM, a CD-ROM, a magnetic tape, a floppy disc, an optical data storage device, or the like.

Figure 13:
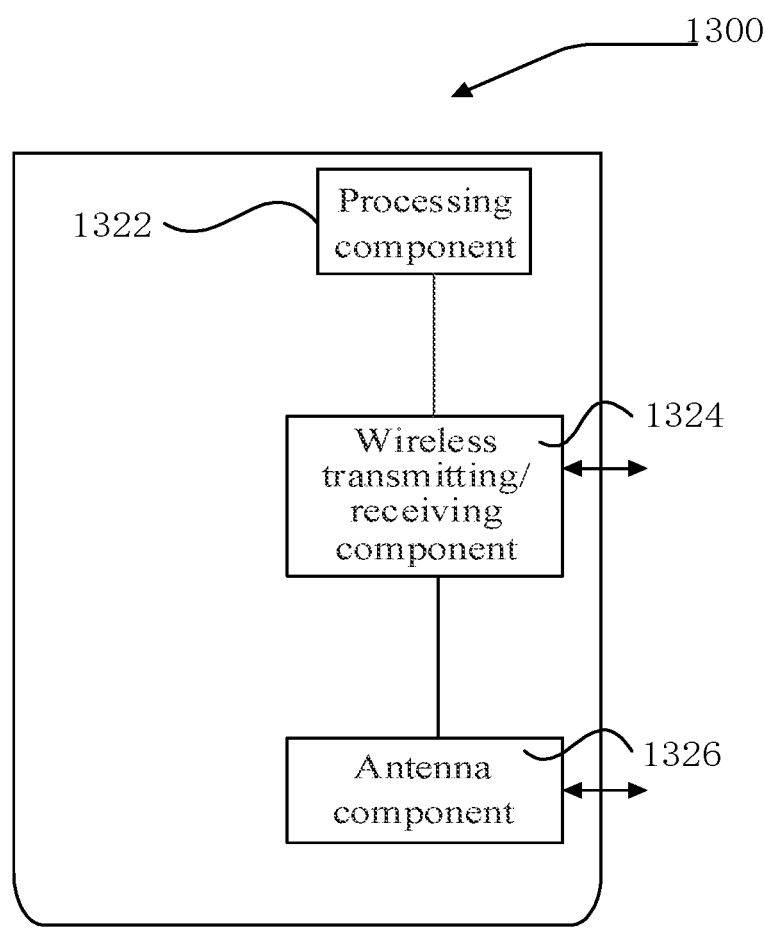
FIG. 13 is a block diagram of an apparatus suitable for eliminating intermodulation interference according to an example.

FIG. 13 is a block diagram of an apparatus suitable for data sending according to an example. The apparatus 1300 may be provided as a base station. Referring to FIG. 13, the apparatus 1300 includes a processing component 1322, a wireless transmitting/receiving component 1324, an antenna component 1326 and a signal processing portion specific to wireless interfaces. The processing component 1322 may further include one or more processors.

One processor of the processing component 1322 may be configured to execute the method for eliminating intermodulation interference described in the above second aspect.

In examples, there is also provided a non-transitory computer readable storage medium including instructions. These instructions may be executed by the processing component 1322 in the apparatus 1300 for executing the above method described in the above first aspect: determining a second signaling based on the first signaling, in which the first signaling is a user equipment capability enquiry signaling, and the second signaling carries instruction information instructing the user equipment to send transmission capacity on a combination of different frequency bands; and sending the second signaling.

In one example, the non-transitory computer-readable storage medium may be a ROM, a RAM, a CD-ROM, a magnetic tape, a floppy disc, an optical data storage device, or the like.

In order to overcome the problems in the related art, examples of the present disclosure provide a method and an apparatus for eliminating intermodulation interference, a user equipment and a base station, which are used to configure resources on a combination of different frequency bands for a UE in an NSA scenario on the premise that the UE does not generate intermodulation interference, and to improve the data transmission performance of the UE.

According to a first aspect of examples of the present disclosure, a method for eliminating intermodulation interference is provided. The method is applied to a base station. The methods includes:

determining a second signaling based on a first signaling, wherein the first signaling is a user equipment capability enquiry signaling, and the second signaling carries instruction information instructing a user equipment to send transmission capacity on a combination of different frequency bands; and sending the second signaling.

In an example, determining the second signaling based on the first signaling includes:

adding a third signaling to the user equipment capability enquiry signaling to obtain the second signaling, wherein the third signaling is used to instruct the user equipment to send the transmission capacity on the combination of different frequency bands.

In an example, the third signaling includes a frequency band list, and the frequency band list records two or more frequency bands.

In an example, the method further includes:

receiving a response signaling returned by the user equipment based on the second signaling;

determining the transmission capacity of the user equipment on the combination of different frequency bands according to the response signaling; and configuring at least one of time resource and frequency resource for data transmission of the user equipment based on the transmission capacity.

In an example, configuring the at least one of time resource and frequency resource for data transmission of the user equipment based on the transmission capacity includes:

configuring at least one of time resource and frequency resource for the user equipment to send data simultaneously on the two frequency bands when data to be transmitted of the user equipment meets a preset condition, in case that it is determined that the user equipment supports simultaneous data sending on two frequency bands based on the transmission capacity; and refusing to configure at least one of time resource and frequency resource for the user equipment to send data simultaneously on the two frequency bands, in case that it is determined that the user equipment does not support simultaneous data sending on two frequency bands based on the transmission capacity.

In an example, the transmission capacity on the combination of different frequency bands includes:

the ability to support simultaneous data sending on the combination of different frequency bands; or the ability to support simultaneous data sending and receiving on the combination of different frequency bands.

According to a second aspect of examples of the present disclosure, a method for eliminating intermodulation interference is provided. The method is applied to a user equipment. The method includes:

receiving a second signaling sent by a base station, wherein the second signaling carries instruction information instructing the user equipment to send transmission capacity on a combination of different frequency bands;

determining a response signaling based on the second signaling, wherein the response signaling carries the transmission capacity of the user equipment on the combination of different frequency bands; and sending the response signaling to the base station.

In an example, determining the response signaling based on the second signaling includes:

determining a combination of frequency bands supported for simultaneous data sending or simultaneous data sending and receiving based on the instruction information in the second signaling; and adding the combination of frequency bands supported for simultaneous data sending or simultaneous data sending and receiving to a new radio frequency parameter signaling, and adding the radio frequency parameter signaling to a network capability signaling supported by the user equipment, to obtain the response signaling.

In an example, determining the combination of frequency bands supported for simultaneous data sending or simultaneous data sending and receiving based on the instruction information in the second signaling includes:

determining the combination of frequency bands supported for simultaneous data sending or simultaneous data sending and receiving from two or more frequency bands recorded in a frequency band list, in case that the second signaling includes the frequency band list.

In an example, the transmission capacity of the user equipment on the combination of different frequency bands includes:

the ability of the user equipment to support simultaneous data sending on the combination of different frequency bands; or the ability of the user equipment to support simultaneous data sending and receiving on the combination of different frequency bands.

According to a third aspect of examples of the present disclosure, an apparatus for eliminating intermodulation interference is provided. The apparatus is applied to a base station. The apparatus includes:

a first determining module configured to determine a second signaling based on a first signaling, wherein the first signaling is a user equipment capability enquiry signaling, and the second signaling carries instruction information instructing a user equipment to send transmission capacity on a combination of different frequency bands; and a first sending module configured to send the second signaling determined by the first determining module.

In an example, the first determining module includes:

a first adding submodule configured to add a third signaling to the user equipment capability enquiry signaling to obtain the second signaling, wherein the third signaling is used to instruct the user equipment to send the transmission capacity on the combination of different frequency bands.

In an example, the third signaling includes a frequency band list, and the frequency band list records two or more frequency bands.

In an example, the apparatus further includes:

a first receiving module configured to receive a response signaling returned by the user equipment based on the second signaling;

a second determining module configured to determine the transmission capacity of the user equipment on the combination of different frequency bands according to the response signaling; and a resource configuration module configured to configure at least one of time resource and frequency resource for data transmission of the user equipment based on the transmission capacity.

In an example, the resource configuration module includes:

a first configuration submodule configured to configure at least one of time resource and frequency resource for the user equipment to send data simultaneously on the two frequency bands when data to be transmitted of the user equipment meets a preset condition, in case that it is determined that the user equipment supports simultaneous data sending on two frequency bands based on the transmission capacity; and a second configuration submodule configured to refuse to configure at least one of time resource and frequency resource for the user equipment to send data simultaneously on the two frequency bands, in case that it is determined that the user equipment does not support simultaneous data sending on two frequency bands based on the transmission capacity.

In an example, the transmission capacity on the combination of different frequency bands includes:

the ability to support simultaneous data sending on the combination of different frequency bands; or the ability to support simultaneous data sending and receiving on the combination of different frequency bands.

According to a fourth aspect of examples of the present disclosure, an apparatus for eliminating intermodulation interference is provided. The apparatus is applied to a user equipment. The apparatus includes:

a second receiving module configured to receive a second signaling sent by a base station, wherein the second signaling carries instruction information instructing the user equipment to send transmission capacity on a combination of different frequency bands;

a third determining module configured to determine a response signaling based on the second signaling received by the second receiving module, wherein the response signaling carries the transmission capacity of the user equipment on the combination of different frequency bands; and a second sending module configured to send the response signaling determined by the third determining module to the base station.

In an example, the third determining module includes:

a determining submodule configured to determine a combination of frequency bands supported for simultaneous data sending or simultaneous data sending and receiving based on the instruction information in the second signaling; and a second adding submodule configured to add the combination of frequency bands supported for simultaneous data sending or simultaneous data sending and receiving to a new radio frequency parameter signaling, and add the radio frequency parameter signaling to a network capability signaling supported by the user equipment, to obtain the response signaling.

In an example, the determining submodule is configured to determine the combination of frequency bands supported for simultaneous data sending or simultaneous data sending and receiving from two or more frequency bands recorded in a frequency band list, in case that the second signaling includes the frequency band list.

In an example, the transmission capacity of the user equipment on the combination of different frequency bands includes:

the ability of the user equipment to support simultaneous data sending on the combination of different frequency bands; or the ability of the user equipment to support simultaneous data sending and receiving on the combination of different frequency bands.

According to a fifth aspect of examples of the present disclosure, a base station is provided. The base station includes:

a processor; and a memory for storing processor-executable instructions; wherein the processor is configured to:

determine a second signaling based on a first signaling, wherein the first signaling is a user equipment capability enquiry signaling, and the second signaling carries instruction information instructing a user equipment to send transmission capacity on a combination of different frequency bands; and send the second signaling.

According to a sixth aspect of examples of the present disclosure, a user equipment is provided. The equipment includes:

a processor; and a memory for storing processor-executable instructions; wherein the processor is configured to:

receive a second signaling sent by a base station, wherein the second signaling carries instruction information instructing the user equipment to send transmission capacity on a combination of different frequency bands;

determine a response signaling based on the second signaling, wherein the response signaling carries the transmission capacity of the user equipment on the combination of different frequency bands; and send the response signaling to the base station.

According to a seventh aspect of examples of the present disclosure, a non-transitory computer-readable storage medium having computer instructions stored thereon is provided. The instructions are executed by a processor to:

determine a second signaling based on a first signaling, wherein the first signaling is a user equipment capability enquiry signaling, and the second signaling carries instruction information instructing a user equipment to send transmission capacity on a combination of different frequency bands; and send the second signaling.

According to a eighth aspect of examples of the present disclosure, a non-transitory computer-readable storage medium having computer instructions stored thereon is provided. The instructions are executed by a processor to:

receive a second signaling sent by a base station, wherein the second signaling carries instruction information instructing a user equipment to send transmission capacity on a combination of different frequency bands;

determine a response signaling based on the second signaling, wherein the response signaling carries the transmission capacity of the user equipment on the combination of different frequency bands; and send the response signaling to the base station.

The technical solutions provided by examples of the present disclosure may include the following beneficial effects:

When a base station needs to configure a wireless communication link for a user equipment, a user equipment capability enquiry signaling can be sent to the user equipment to obtain transmission capacity of the user equipment on a combination of different frequency bands, thereby determining on which combination of frequency bands the user equipment does not generate intermodulation interference when sending data, and configuring the user equipment with at least one of time resource and frequency resource that do not generate intermodulation interference, which improves the data transmission performance of the user equipment.

Other examples of the present disclosure will be apparent to those skilled in the art from consideration of the specification and practice of the present disclosure. This application is intended to cover any variations, uses, or adaptations of the present disclosure following the general principles thereof and including common knowledge or commonly used technical measures which are not disclosed herein. The specification and examples are to be considered as exemplary only.

It will be appreciated that the present disclosure is not limited to the exact construction that has been described above and illustrated in the accompanying drawings, and that various modifications and changes can be made without departing from the scope thereof.

What is claimed is:

1. A method for eliminating intermodulation interference, comprising:

determining, by a base station, a second signaling based on a first signaling, wherein the first signaling is a user equipment capability enquiry signaling, and the second signaling carries instruction information instructing the user equipment to send transmission capacity on a combination of different frequency bands, wherein a frequency band for receiving data is a part of frequency bands for sending data;

sending, by the base station, the second signaling to the user equipment;

receiving, by the base station, a response signaling returned by the user equipment based on the second signaling;

determining, by the base station, the transmission capacity of the user equipment on the combination of the different frequency bands according to the response signaling, wherein the transmission capacity of the user equipment on the combination of the different frequency bands comprises an ability to support simultaneous data sending and receiving on the combination of the different frequency bands, wherein the ability to support simultaneous data sending and receiving on the combination of the different frequency bands comprises sending data simultaneously on the different frequency bands in the combination, and supporting simultaneous data receiving on a sub-portion of the different frequency bands in the combination; and determining on which combination of the different frequency bands the user equipment does not generate intermodulation interference when sending data simultaneously based on the transmission capacity, and configuring the user equipment with time-frequency resources that do not generate the intermodulation interference by: configuring at least one of time resource and frequency resource for the user equipment to send data simultaneously on two frequency bands when data to be transmitted of the user equipment meets a preset condition, in case that it is determined that the user equipment supports simultaneous data sending on the two frequency bands based on the transmission capacity; and refusing to configure the at least one of time resource and frequency resource for the user equipment to send data simultaneously on the two frequency bands, in case that it is determined that the user equipment does not support simultaneous data sending on the two frequency bands based on the transmission capacity.

2. The method according to claim 1, wherein determining, by the base station, the second signaling based on the first signaling comprises:
   obtaining the second signaling by adding a third signaling to the user equipment capability enquiry signaling, wherein the third signaling instructs the user equipment to send the transmission capacity on the combination of the different frequency bands.

3. The method according to claim 2, wherein the third signaling comprises a frequency band list, and the frequency band list comprises two or more frequency bands.

4. A method for eliminating intermodulation interference applied to a user equipment, comprising:
   receiving a second signaling sent by a base station, wherein the second signaling carries instruction information instructing the user equipment to send transmission capacity on a combination of different frequency bands, wherein the combination of the different frequency bands for sending data is a part of frequency bands for receiving data;
   determining a response signaling based on the second signaling, wherein the response signaling carries the transmission capacity of the user equipment on the combination of the different frequency bands, wherein the transmission capacity of the user equipment on the combination of the different frequency bands comprises an ability to support simultaneous data sending and receiving on the combination of the different frequency bands; wherein the ability to support simultaneous data sending and receiving on the combination of the different frequency bands comprises sending data simultaneously on the different frequency bands in the combination, and supporting simultaneous data receiving on a sub-portion of the different frequency bands in the combination; and
   sending, by the user equipment, the response signaling to the base station, to cause the base station to determine the transmission capacity of the user equipment on the combination of the different frequency bands according to the response signaling, determine on which combination of the different frequency bands the user equipment does not generate intermodulation interference when sending data simultaneously based on the transmission capacity, and configure the user equipment with time-frequency resources that do not generate the intermodulation interference by: configuring at least one of time resource and frequency resource for the user equipment to send data simultaneously on two frequency bands when data to be transmitted of the user equipment meets a preset condition, in case that it is determined that the user equipment supports simultaneous data sending on the two frequency bands based on the transmission capacity; and refusing to configure the at least one of time resource and frequency resource for the user equipment to send data simultaneously on the two frequency bands, in case that it is determined that the user equipment does not support simultaneous data sending on the two frequency bands based on the transmission capacity.

5. The method according to claim 4, wherein determining the response signaling based on the second signaling comprises:
   determining the combination of the different frequency bands supported for simultaneous data sending or simultaneous data sending and receiving based on the instruction information in the second signaling; and
   obtaining the response signaling by adding the combination of the different frequency bands supported for simultaneous data sending or simultaneous data sending and receiving to a new radio frequency parameter signaling, and adding the radio frequency parameter signaling to a network capability signaling supported by the user equipment.

6. The method according to claim 5, wherein determining the combination of the different frequency bands supported for simultaneous data sending or simultaneous data sending and receiving based on the instruction information in the second signaling comprises:
   determining the combination of the different frequency bands supported for simultaneous data sending or simultaneous data sending and receiving from two or more frequency bands comprised in a frequency band list, in case that the second signaling comprises the frequency band list.

7. A base station, comprising:
   a processor; and
   a memory for storing processor-executable instructions;
   wherein the processor is configured to:
   determine, by the base station, a second signaling based on a first signaling, wherein the first signaling is a user equipment capability enquiry signaling, and the second signaling carries instruction information instructing the user equipment to send transmission capacity on a combination of different frequency bands, wherein a frequency band for receiving data is a part of frequency bands for sending data;
   send, by the base station, the second signaling to the user equipment;
   receive, by the base station, a response signaling returned by the user equipment based on the second signaling;
   determine the transmission capacity of the user equipment on the combination of the different frequency bands according to the response signaling, wherein the transmission capacity of the user equipment on the combination of the different frequency bands comprises an ability to support simultaneous data sending and receiving on the combination of the different frequency bands, wherein the ability to support simultaneous data sending and receiving on the combination of the different frequency bands comprises sending data simultaneously on the different frequency bands in the combination, and supporting simultaneous data receiving on a sub-portion of the different frequency bands in the combination; and
   determine on which combination of the different frequency bands the user equipment does not generate intermodulation interference when sending data simultaneously based on the transmission capacity, and configure the user equipment with time-frequency resources that do not generate the intermodulation interference by: configuring at least one of time resource and frequency resource for the user equipment to send data simultaneously on two frequency bands when data to be transmitted of the user equipment meets a preset condition, in case that it is determined that the user equipment supports simultaneous data sending on the two frequency bands based on the transmission capacity; and refusing to configure the at least one of time resource and frequency resource for the user equipment to send data simultaneously on the two frequency bands, in case that it is determined that the user equipment does not support simultaneous data sending on the two frequency bands based on the transmission capacity.

8. The base station according to claim 7, wherein the processor is further configured to:
obtain the second signaling by adding a third signaling to the user equipment capability enquiry signaling, wherein the third signaling instructs the user equipment to send the transmission capacity on the combination of the different frequency bands.

9. The base station according to claim 8, wherein the third signaling comprises a frequency band list, and the frequency band list comprises two or more frequency bands.

10. A user equipment, comprising:
a processor; and
a memory for storing processor-executable instructions;
wherein the processor is configured to implement the method for eliminating intermodulation interference according to any one of claims 4-6.

* * * * *